US000001140H

United States Statutory Invention Registration [19]

[11] Reg. Number: H1140

Greenwood et al.

[43] Published: Feb. 2, 1993

[54] ASBESTOS FREE ADHESIVE INSULATION

[76] Inventors: Stewart H. Greenwood, 135 W. 4300 North, Pleasant View, Utah 84414; Gordon A. Caldwell, 2435 S. 550 West, Perry, Utah 84302

[21] Appl. No.: 660,316

[22] Filed: Feb. 22, 1991

[51] Int. Cl.[5] ..... C08J 3/00

[52] U.S. Cl. ..... 523/180; 523/466

[58] Field of Search ..... 523/466, 180; 528/123

[56] References Cited

U.S. PATENT DOCUMENTS

| | | | |
|---|---|---|---|
| 2,986,539 | 5/1961 | Schniepp et al. | 528/123 |
| 3,075,932 | 1/1963 | Edwards et al. | 528/123 |
| 3,085,075 | 4/1963 | Lockshin et al. | 528/123 |
| 3,183,198 | 5/1965 | Wagner | 528/123 |
| 3,396,138 | 8/1968 | Weller | 523/466 |
| 4,162,931 | 7/1979 | Yeakey et al. | 524/159 |

*Primary Examiner*—Robert L. Stoll
*Assistant Examiner*—Joseph D. Anthony

[57] ABSTRACT

An epoxy adhesive for bonding solid fuel to its case in a rocket motor uses chopped aramid fiber and microfine silicon dioxide filler to provide insulating properties to the adhesive without the use of asbestos.

1 Claim, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ASBESTOS FREE ADHESIVE INSULATION

FIELD OF THE INVENTION

This invention pertains to an insulating adhesive for bonding rocket motor components.

BACKGROUND OF THE INVENTION

Adhesives for bonding fuels and insulation into rocket motor casings in the prior art have often contained asbestos to make the adhesives more resistant to the hot gases in the rocket motor. These adhesives have three functions: first to insulate the fuel against heating due to air friction, second to insulate the casing from the heat of the burning fuel and third to bond the fuel to the case. It is undesirable to have voids between the fuel and the combustion chamber wall since such voids could permit combustion at undesirable times and places, impairing the efficiency of the rocket and endangering the integrity of the combustion chamber. The possible danger to the health of workers with asbestos makes it desirable to find other ways of accomplishing the same goals of good bonding combined with good insulation properties without the use of asbestos.

OBJECTIVES OF THE INVENTION

It is therefore the primary objectives of the present invention to create an insulating adhesive suitable for use in a rocket motor which does not require use of asbestos while retaining good bonding and insulating properties.

SUMMARY OF THE INVENTION

These objects of the invention and other objects, features and advantages to become apparent as the specification progresses are accomplished by the invention according to which, briefly stated, an epoxy adhesive for bonding solid fuel to its case in a rocket motor uses chopped aramid fiber and microfine silicon dioxide filler to provide insulating properties to the adhesive without the use of asbestos.

LIST OF ADVANTAGES OF THE INVENTION

An important advantage of the present invention is the elimination of the use of asbestos in the workplace.

Other advantages are that the adhesive bonding remains as strong as prior art adhesives using asbestos and the thermal insulating properties remain good as good.

These and further objectives, constructional and operational characteristics, and advantages of the invention will no doubt be more evident to those skilled in the art from the detailed description given hereinafter which illustrates a preferred embodiment by way of non-limiting example.

DESCRIPTION OF THE PREFERRED EMBODIMENT

The invention is an asbestos free adhesive, which by using Kevlar pulp as a filler, has excellent thermal, erosive, and physical properties for use in solid propellant rocket motors. The adhesive has ratio of ingredients by weight:

| | |
|---|---|
| Bisphenol A/Epichlorohydrin type liquid epoxy resin: | 27.8 |
| poly liquid resin curing agent: | 51.6 |
| chopped aramid fiber pulp: | up to 2.0 |
| microfine silicon dioxide: | up to 1.0 |

This adhesive has the potential for several uses in solid propellant rocket motors. The physical properties make it an excellent choice for bonding elastomer insulations together where high bond strengths are required. Specific examples of this type of usage are bonding splice strips and patches onto internal insulation, and bonding the propellant stress relief flap into the motor. Its erosion and thermal properties permit its use as a potting compound for making repairs to the insulation and protecting sensitive components from the motor environment.

The adhesive is prepared by slowly mixing the Bisphenol A/Epichlorohydrin type liquid epoxy resin (LER Type II such as Epon 828) and poly liquid resin curing agent (such as Versamid 140) for approximately 3 minutes. Concurrently, the microfine silicon dioxide (such as Cab-O-Sil) and chopped aramid pulp (such as Kevlar) is whipped together until the aramid fiber bundles are separated.

The dry and the wet mixtures are combined and mixed until fully wetted. After wetting the adhesive shall continue to be mixed for 3–5 minutes.

The adhesive can be cured at ambient temperature (60°–100° F.) in 24 hours or the cure may be accelerated by curing at a higher temperature. The pot life of the adhesive is approximately 2 hours.

This invention is not limited to the preferred embodiment heretofore described, to which variations and improvements may be made, without departing from the scope of protection of the present patent and true spirit of the invention, the characteristics of which are summarized in the following claim.

We claim:

1. An adhesive for bonding a solid fuel propellant to a case in a rocket motor essentially consisting of, by weight:

| | |
|---|---|
| Bisphenol A/Epichlorohydrin type liquid epoxy resin: | 27.8 |
| poly liquid resin curing agent: | 51.6 |
| chopped aramid fiber pulp: | up to 2.0 |
| microfine silicon dioxide: | up to 1.0. |

* * * * *